Figure 1:
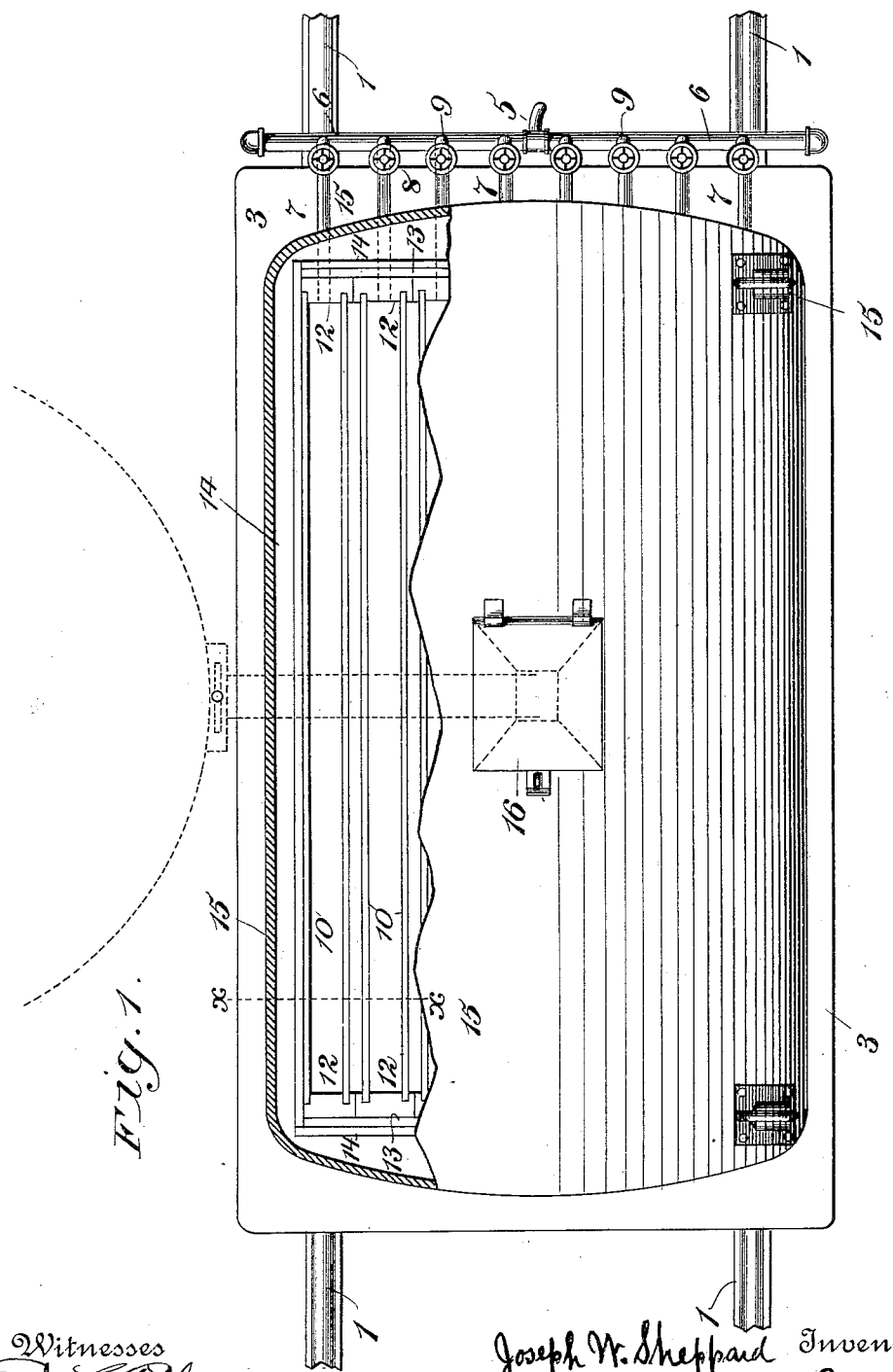

No. 653,849. Patented July 17, 1900.
J. W. SHEPPARD.
DEVICE FOR CASTING SHEET GLASS.
(Application filed Oct. 13, 1899.)
(No Model.) 2 Sheets—Sheet 1.

No. 653,849. Patented July 17, 1900.
J. W. SHEPPARD.
DEVICE FOR CASTING SHEET GLASS.
(Application filed Oct. 13, 1899.)
(No Model.) 2 Sheets—Sheet 2.
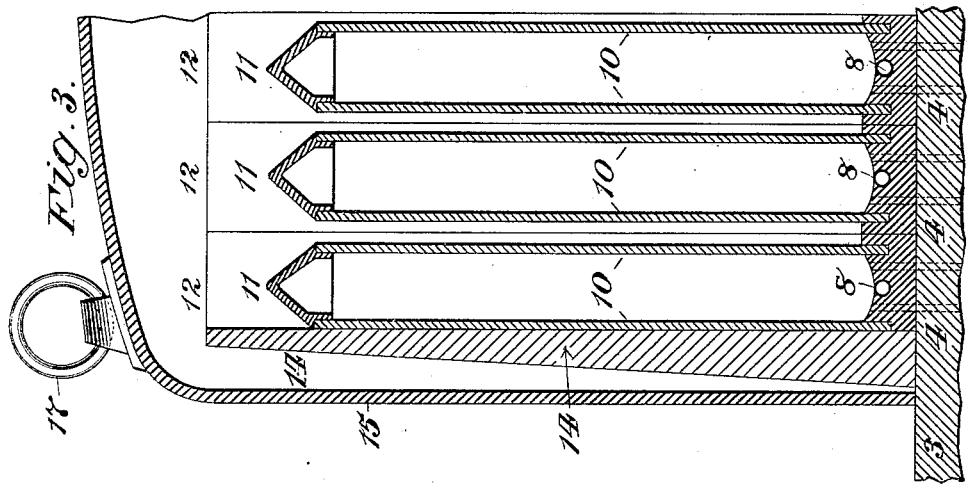
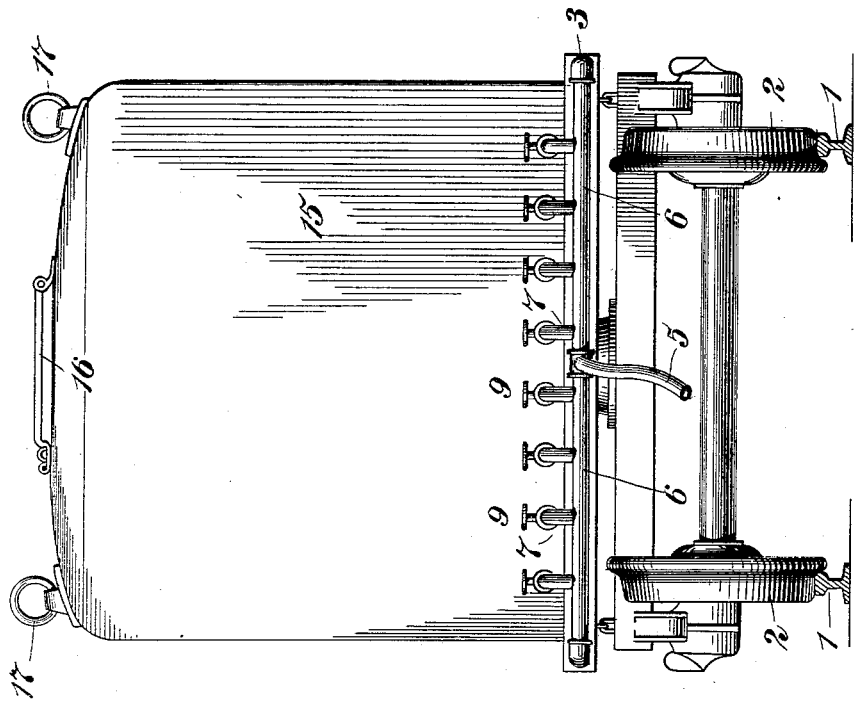
Witnesses
Edward Rowland
Peter L. Dixon
Joseph W. Sheppard, Inventor
By his Attorney A. M. Pierce

UNITED STATES PATENT OFFICE.

JOSEPH W. SHEPPARD, OF NEW YORK, N. Y.

DEVICE FOR CASTING SHEET-GLASS.

SPECIFICATION forming part of Letters Patent No. 653,849, dated July 17, 1900.

Application filed October 13, 1899. Serial No. 733,467. (No model.)

*To all whom it may concern:*

Be it known that I, JOSEPH W. SHEPPARD, a citizen of the United States, residing in the city, county, and State of New York, have invented a new and useful Improvement in Devices for Casting Sheet-Glass, of which the following is a specification.

My invention relates especially to the making of sheet-glass, and has for its object the provision of means for forming the same by casting.

To attain the desired end my invention consists in certain novel and useful combinations or arrangements of parts and peculiarities of construction and operation, all of which will be hereinafter first fully described and then pointed out in the claims.

In carrying my invention into effect I cast the glass between sheets or walls of metal or other suitable material having smooth or polished surfaces if transparent glass is desired or ribbed or embossed surfaces if figured or translucent glass is desired, these sheets of metal or molds being so adjusted in relation to each other upon a properly-constructed platform provided with running-gear that there is space between the sheets forming the molds for the application of heat not only before the glass is brought in contact with the molds, but also during the time consumed in casting and for some time thereafter, according to the requirements of the annealing process, which takes place in the molds.

The sheets of metal forming the group of molds, located side by side, are so arranged that the spaces for the reception of the molten glass are open at the top and closed at the sides and bottom, while the heating-chambers located on each side of the molds are closed all around, provision being made for the proper ventilation, according to the requirements of the process of heating.

The sheets forming the molds may be of any size desired and so adjusted as to admit of the formation of a sheet of glass of any desired thickness, even varying in thickness or design in the same group or series, and twenty, more or less, may constitute a group, according to the size of the truck that carries them or the platform upon which they are assembled. They are firmly held together in any efficient manner, and the whole group then constitutes virtually a solid mass of sheets, and as the heat is very evenly distributed and is kept around the group of molds by a cover or hood made of suitable material it is plainly seen that the warping of the sheets of glass is simply impossible. The hood or cover may be made of the proper dimensions to fit over a certain-size group of molds and to entirely envelop them during the process of heating some time before the casting of the glass, and when the group of molds has been heated to the desired degree the truck upon which the group of molds rests is pushed along the track to a suitable place near the furnace, when the molten glass is poured in through an opening in the cover or hood, and the molten glass so poured on the top of the molds surrounded by an intensely-hot atmosphere gradually fills all the open spaces, sinking into the hot molds by gravitation until they are filled. Then the truck, with the process of heating still going on, can be pushed back to the place from which it was taken and the process of annealing consummated by the gradual reduction of heat until at last no artificial heat is applied, and when the molds are cooled and the hood or cover lifted the sheets of glass are removed.

According to the capacity of the furnace a number of trucks upon which the groups of molds are placed can be used, each truck standing upon its own switch connected with the track that leads to the furnace from which the molten glass is obtained, whereby there is great economy of time and labor gained.

By my present invention the air in the molds so constructed and heated becomes so rarefied before the molten glass is poured in that there is virtually none left of sufficient density to affect the glass. Hence it of necessity follows that there are no air-bubbles in sheets of glass cast by this method, and as the surfaces of the molds so formed will be of even and great temperature, regulated at will, the molten glass will retain its plastic state until it has evenly filled the molds. Hence does my invention entirely overcome the aforementioned defects of the processes now in use, which produce sheets of glass of uneven thickness. Thus it is seen that my invention produces sheets of glass without either air-bubbles, uneven thicknesses, or warping, and in addition thereto it will produce sheets of glass having as smooth and polished a surface as that of the molds in which it is cast, therefore producing clear and transparent glass of any dimensions or thickness without the use of the grinding-wheels or polishing-tables and at no more cost than what is necessary for me to produce translucent or figured glass. Likewise as the glass will be kept in a plastic state until it has entirely filled the molds, and so is kept from coming in contact with cooler air or metal to prematurely chill it in part or in whole, it follows that the sheets of glass made in accordance with my invention will never be known as "lappy glass" and will be of even cutting quality throughout, thus avoiding the possibility of producing the hard-cutting sheets, also the lappy glass, that so often are the result of the processes heretofore known.

As hot metal and molten glass adhere to each other when brought in close contact, it might at first sight appear that this fact would be an impediment to the practical working of my invention; but experience shows that though the two adhere while they are in a heated state they will separate by natural contraction of the metal as the heat gets less, and as the molds are kept to a great heat for some time after the molten glass has been dumped or allowed to flow into the space at the top of the group or series of heated molds under the hood or cover the glass will not therefore prematurely harden, but being kept for some time in a plastic state will be free to seek its level by the law of gravitation, so the molds will be filled to their full capacity, and the product will of necessity be of a superior quality, yet produced at a greatly-reduced cost. Likewise, in addition thereto, there is also a still further economy in the practical utilization of my invention, as it entirely dispenses with the annealing-oven and the labor required to operate it.

In the accompanying drawings, forming a part hereof, Figure 1 is a plan view of a device designed for carrying my invention into effect. Fig. 2 is an end elevation thereof. Fig. 3 is an enlarged vertical sectional view through a part of the molds at line $x\ x$ of Fig. 1.

Similar numerals of reference wherever they occur indicate corresponding parts in all the figures.

1 is a track, straight and provided with switches or turnouts, or circular, as desired.

2 are the supporting-wheels of a truck having a body or platform 3, whereon is located a sectional fireproof floor 4, made of fire-brick or the equivalent.

5 is a flexible gas pipe or hose from any source of gas-supply leading to a distributing-pipe 6, fixed to the truck-body.

7 are branch pipes which conduct the gas from the supply 6 to burning devices 8 in the flooring 4, the flow to the branch pipes being regulated by means of valves 9, and air to support combustion is admitted through perforations (indicated by the dotted lines) through the sections of flooring 4.

10 are plates preferably made of steel and in the case of use for making transparent glass having their faces highly polished.

11 are removable caps the shape of an inverted V, which fit over and rest upon each pair of plates 10. At the bottom each plate 10 fits into a groove in one of the floor-sections 4 and at each side into grooves in sectional supporting-pieces 12, which in turn are held in place by a plate 13, which may be the entire length of the series of molds or made in parts, as desired.

14 is a sustaining-bracket, one of these being placed at each side of a series or group of molds.

15 is a hood. This hood is arranged to completely envelop the molds and is provided at top with a door 16 for the supply of molten glass, as indicated in Fig. 1 of the drawings, and with lifting-rings 17.

In assembling the molds for use the floor-sections 4 are first placed in position upon the truck or platform. Two plates 10 are then set up in the grooves therein next to a bracket 14, and a section 12 of the support is placed at each end of the plates, and a cap 11 over the top of the two plates. Side plates 13 are placed against the first section of the series or group of molds so commenced, these side plates 13 being drawn along the supporting-platform until the entire group of molds is completed, when the parts are wedged together between the brackets 14. It will be observed that a space is left between each two of the plates 10, this space being closed at the bottom and ends and open at the top, forming a mold for a sheet of glass. The hood or cover 15 is now placed in position over the completed series or group of molds and the gas is ignited within the hollow spaces between the molds, forming the walls thereof, and the molds are heated to the desired degree.

I have shown my invention as arranged for heating by the combustion of gas; but it is obvious that electricity might be employed as a heating medium, if desired, as I do not limit myself to any specific means of heating the molds.

When the molds are brought to the proper degree of heat, the truck is run to the source of supply of molten glass, which is caused to flow into the space at the top of the molds and over the upper extremities of the heated walls, finding its way down into the spaces between the sections until the molds are completely filled. During this time the heat of the molds is maintained, and after the supply of molten glass is obtained the truck carrying the series of molds is run to any convenient point and the heat gradually decreased by properly regulating the amount of gas consumed until the supply is entirely cut off, permitting the molds and contained glass to cool to the temperature of the atmosphere, thus annealing the glass within the molds without any handling whatever, when it is removed by separating the sections of the molds, being in proper condition for immediate use or shipment. The molds are now again assembled and kept in use continuously, if desired, and any number of trucks having groups of molds upon them can thus be employed to the full capacity of the furnace.

Having now fully described my invention, what I claim as new therein, and desire to secure by Letters Patent, is—

1. A built-up, separable mold for casting sheet-glass consisting of two parallel plates of polished metal; divided end and bottom pieces with which said plates engage, and means for applying heat to the mold in combination with an enveloping hood or cover, substantially as shown and described.

2. In a device of the character herein specified, a built-up, separable mold for casting sheet-glass in which are comprised two parallel plates forming the side walls of the mold; grooved, divided bottom and end pieces with which said plates separably engage; and means for applying heat to the said plates, in combination with a support upon which said mold is assembled and secured.

3. In a device of the character herein specified, a group or series of molds in which are comprised a plurality of parallel plates forming the sides of the molds; divided end and bottom pieces with which said plates engage; sloping caps arranged to fit over each pair of plates between the molding-spaces and below the tops of the end pieces, in combination with means for applying heat to the molds, substantially as shown and described.

4. A group or series of separable molds; means for securing said molds together; means for heating said molds, and regulating the temperature thereof; a hood or cover for enveloping said molds, and a supporting truck or platform, the whole combined and arranged substantially as shown and described.

Signed by me at New York, N. Y., this 11th day of October, 1899.

JOSEPH W. SHEPPARD.

Witnesses:
A. M. PIERCE,
LESTER L. SISSON.